United States Patent [19]

Tausheck

[11] Patent Number: 4,558,622
[45] Date of Patent: Dec. 17, 1985

[54] APPARATUS FOR CUTTING LAMINATED GLASS

[76] Inventor: Russell Tausheck, P.O. Box 4114, Oakland, Calif. 94614

[21] Appl. No.: 548,669

[22] Filed: Nov. 4, 1983

[51] Int. Cl.[4] .................................... B26D 3/08
[52] U.S. Cl. ................................. 83/885; 83/886; 83/455; 83/485; 225/96.5
[58] Field of Search ............... 83/885, 881, 886, 485, 83/487, 582, 489, 614, 455; 33/32 R, 32 C; 30/286, 287, 289, 290, 292, 294; 225/96, 96.5

[56] References Cited

U.S. PATENT DOCUMENTS

| | | | |
|---|---|---|---|
| 2,706,002 | 4/1955 | Whittamore | 83/885 |
| 2,964,848 | 12/1960 | Gonsalves | 33/32 |
| 3,370,767 | 2/1968 | Barrett | 83/886 X |
| 4,183,274 | 1/1980 | Kingsley | 83/886 |
| 4,471,895 | 9/1984 | Lisec | 225/96.5 |

Primary Examiner—James M. Meister
Assistant Examiner—John L. Knoble
Attorney, Agent, or Firm—John J. Leavitt

[57] ABSTRACT

A method and apparatus for cutting laminated glass, particularly large sheets. Laminated glass panes utilize two layers of glass having a thin layer of plastic material sandwiched adhesively between the two layers of glass. The apparatus simultaneously scores both sides of the laminated glass pane, i.e., both layers of glass that make up the laminated pane are simultaneously scored so that both layers of glass may be successively cracked along the score lines and the layers spaced apart along the score line while still connected by the layer of plastic material so as to give access to the intermediate layer of resilient plastic material, which is then cut in a subsequent step.

12 Claims, 12 Drawing Figures

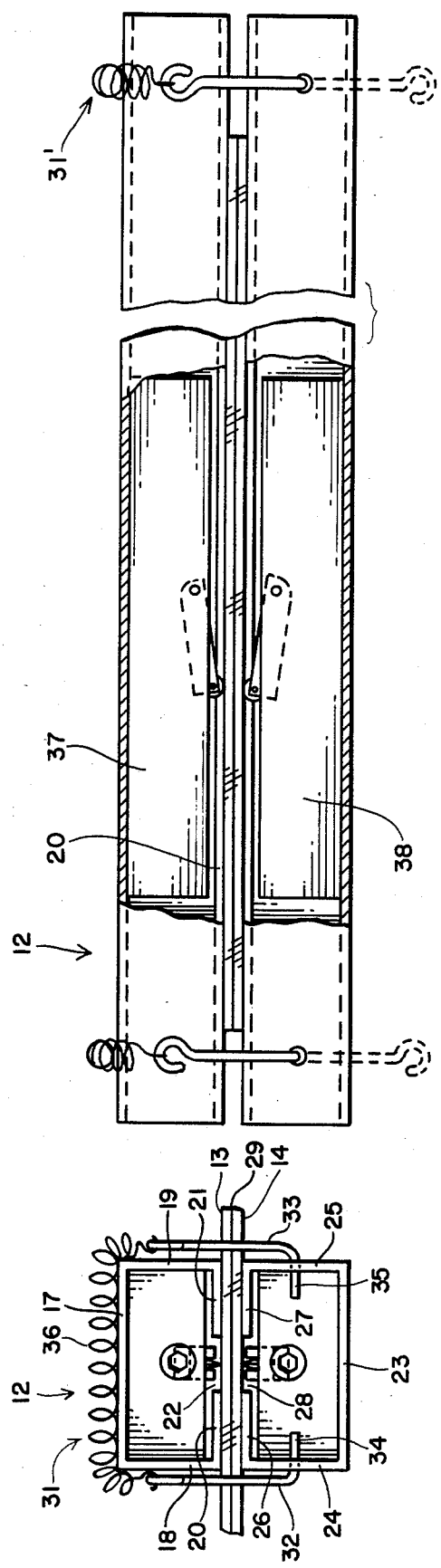

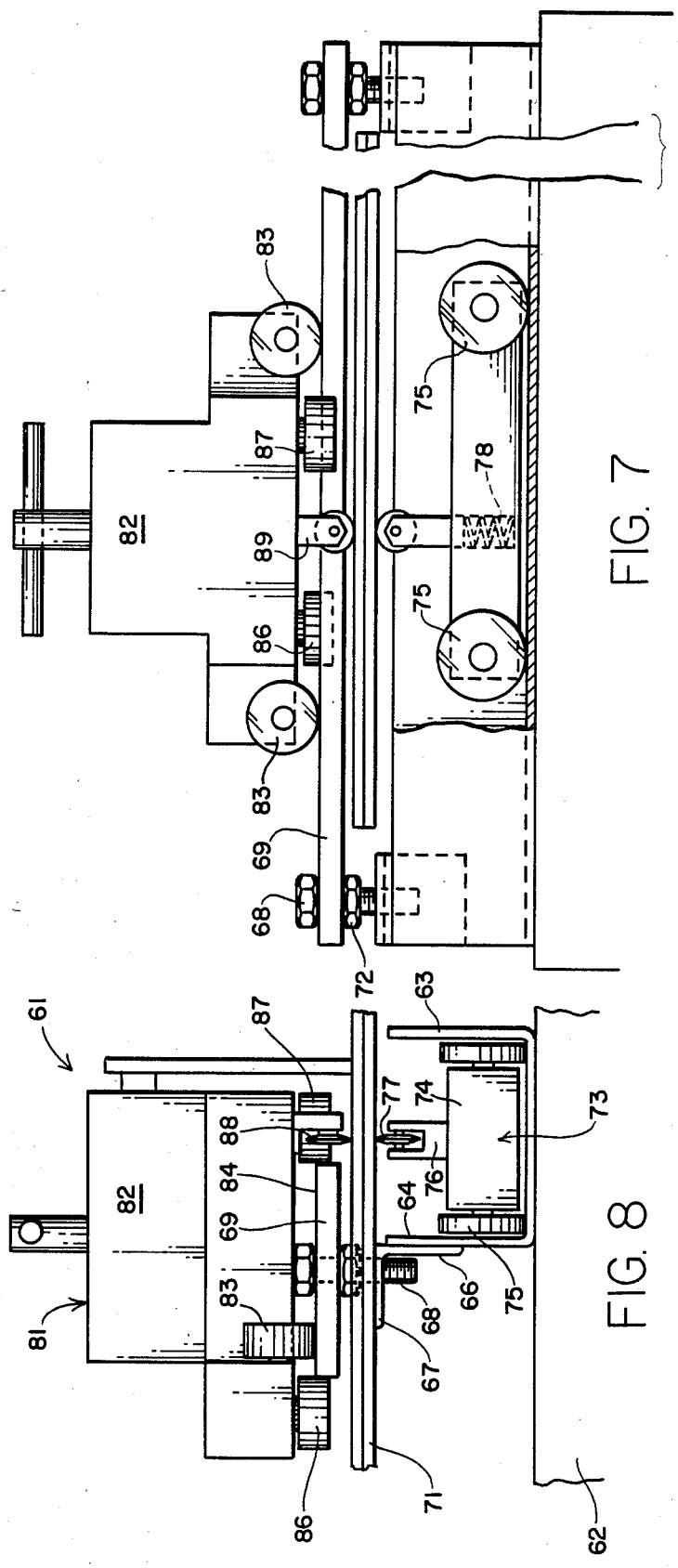

APPARATUS FOR CUTTING LAMINATED GLASS

BACKGROUND OF THE INVENTION

1. Field of the Invention

This invention relates to glass technology, and particularly to a method and apparatus for cutting sheets of laminated glass having a resilient intermediate layer.

2. Description of the Prior Art

The prior art relating to this invention is believed contained in Class 83, sub-classes 879, 883, 884, 885, 455, 489, 485, and 665; and Class 33, sub-class 32; and Class 30, sub classes 286, 287, 289, 290, 292 and 294.

A search through this field of search has revealed the existence of six patents as follows: U.S. Pat. Nos. 2,273,716 2,058,092 2,964,848 2,750,674 2,706,002 3,127,680

While five of the above patents relate to the cutting of glass, none of these five patents relate to the problems created in cutting a pane of "safety" or laminated glass so that the two panes of glass that make up the lamination may be separated so as to expose the intermediate resilient plastic sheet material. The sixth patent, U.S. Pat. No. 2,706,002, relates to the cutting of building materials, such as sheet rock or wall board, which is a product that utilizes a matrix of frangible plaster interposed between and adhesively secured to two layers of pressed fibrous paper. This patent discloses an apparatus for cutting through the two surface layers of fibrous paper so that the intermediate frangible matrix may then be cracked so as to separate one part from another. This construction and mode of operation is of course different from that proposed in or by the present invention.

Conventionally, a pane of glass is cut by scoring a line across the pane of glass and then imposing stress in the region of the score line so as to cause the pane of glass to crack along the score line so that one piece may be separated from the other piece on the opposite side of the score line. This procedure is adequate for a pane of glass that is of a single thickness. However, this procedure is not sufficient for glass that constitutes a lamination of two panes or lights of glass having laminated therebetween a layer of a resilient plastic material adhesively secured to the two facing surfaces of the two panes of glass. If a conventional method and apparatus is used to cut "safety" or laminated glass, a first score line has to be made on one of the two panes of glass. Then, the entire double-pane assembly must be turned over so that the opposite side of the pane of glass may be scored. The conventional procedure is then followed to cause each of the panes of glass to crack along the scorelines. Even after cracking, this still leaves the pane intact in that the intermediate layer of resilient plastic material has not been cut and the separate glass portions may not be separated. Additionally, this method poses a problem because after one layer of glass has been scored, it is difficult to turn the entire double-pane assembly of glass over to score the opposite side because the scored portion may crack, thus imposing undue stress on the remaining pane of the laminated pair of panes. This imposition of stress imposed on the remaining pane prior to its scoring operation, tends to cause breakage of the pane. Accordingly, it is one of the principal objects of this invention to provide a method and apparatus for scoring both sides of the laminated double-pane simultaneously so that the entire pane assembly need not be turned over after the scoring operation.

Another object of the invention is the provision of means for imposing stress on the two score lines in the two laminated panes so as to crack both laminated panes of glass without the necessity of turning the sheet of glass over to reverse its attitude on the table.

Another object of the invention is the provision of apparatus which will retain the glass elevated above the table top so as to permit both sides of the laminated pane of glass to be scored simultaneously.

Still another object of the invention is the provision of apparatus which is relatively simple to manufacture, thus being economical and within the reach of most glass shops, and which is relatively simple to manipulate so as to eliminate the necessity of hiring experienced or skilled operators.

The glass industry has been at a disadvantage because laminated panes of glass of large size are too cumbersome for a single individual to manipulate. In fact, the industry has limited to 7'×10' the size of laminated glass panes that are manufactured because of such difficulty in handling. Accordingly, it is still another object of the invention to provide a glass cutting apparatus and method that will permit the industry to manufacture laminated panes of glass in sizes much larger than is usual, and which will enable a single individual to manipulate the larger glass panes and cut smaller panes of glass from the large pane, thus making more economical the manufacture and shipment of laminated glass panes.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the apparatus of the invention comprises a table upon which a large laminated pane of glass may be supported in an elevated position above the table top. Extending transversely across the laminated pane of glass are a pair of beams on opposite sides of the pane of glass. The two beams are biased toward each other so that they are clamped tightly to each other and to the laminated pane on opposite sides of the laminated pane. Each of the beams carries means movable in unison along the beam for simultaneously scoring the associated surfaces of the glass pane to which each beam is clamped. Means are provided causing the now scored laminated pane of glass to be cracked along the score lines to permit cutting of the intermediate resilient plastic layer to thus permit complete separation of one portion of the laminated glass pane from the remaining portion of laminated pane. In one aspect of the invention the means for supporting the large laminated pane of glass elevated above the top surface of the table comprises a plurality of spherical balls each rotatably supported in an appropriate support structure and on which balls the laminated pane of glass may be supported for rolling movement in relation to the table top.

BRIEF DESCRIPTION OF THE DRAWINGS

FIG. 2 is a side elevational view of the beam structure forming a portion of the apparatus. Portions of the structure are broken away to reveal the underlying parts and to reduce the length of the view.

FIG. 3 is an end elevational view of the structure illustrated in FIG. 2.

FIG. 7 is a side elevational view of a second embodiment of the invention, illustrating a permanent installation of a cutting in conjunction with a table.

FIG. 8 is an end elevational view of the embodiment of the invention illustrated in FIG. 7.

DESCRIPTION OF THE PREFERRED EMBODIMENT

Figure 5:
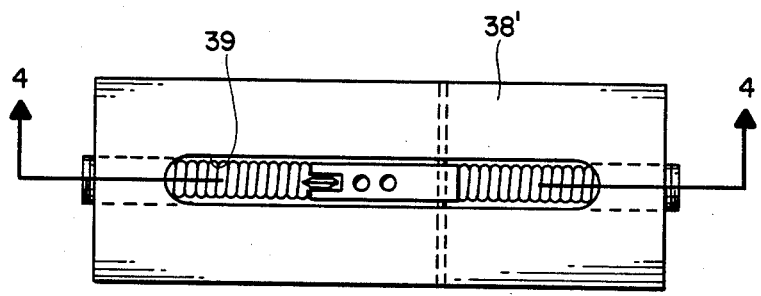
FIG. 5 is a plan view of one of the scoring means apart from the beam on which it is normally supported.

The embodiment of the invention illustrated in FIGS. 1 through 6 is presented as the preferred form or embodiment of the invention. This embodiment of the invention is preferred because it enables great flexibility of use of the invention in that the large laminated pane of glass supported on the table may be retained in a fixed or single position and the cutting apparatus moved from one position to another quite simply and without manipulation of the pane of glass to effect consecutive cuts of the large pane of glass. This is in contrast to the embodiment of the invention illustrated in FIGS. 7 and 8 in which the cutting apparatus is stationary in relation to the table and the laminated pane of glass is moved horizontally in relation to the cutting apparatus to place it in position to be scored by the scoring means movably mounted on the cutting apparatus.

Referring therefore to the embodiment of the invention illustrated in FIGS. 1 through 6, there is shown the designated generally by the numeral 2, and including a table 3 having a top surface 4 on which are positioned spacer or support members 6, each of which is equipped with a rotatable ball 7 which projects from the support structure. When a laminated pane of glass 8 is superimposed above the support members as shown, the pane of glass is movably supported on the spherical balls, which are freely rotatable within their respective support structures, thus enabling the pane of glass 8 to be moved horizontally in relation to the table top to any desired position with a minimum of force being imposed on the glass pane. Additionally, the support structures 6 support the pane of glass 8 spaced above the table top so as to enable detachable attachment to the pane of glass of apparatus designated generally by the numeral 12 manipulable to score the laminated pane of glass simultaneously on its opposite surfaces 13 and 14.

Referring more particularly to the apparatus 12 as illustrated in FIGS. 1 through 6, part of the novelty of the apparatus lies in its simplicity of construction and operation. Thus, the apparatus 12 comprises a pair of oppositely facing elongated hollow channels 15 and 16 possessing a generally C-shaped cross-section as illustrated best in FIG. 3. Each of the channels includes a web portion 17, side walls 18 and 19, and mutually reaching flanges 20 and 21 as shown. The flanges 20 and 21 are spaced apart to provide an opening therebetween constituting an elongated slot 22 that extends the full length of the channels 15 and 16.

Figure 1:
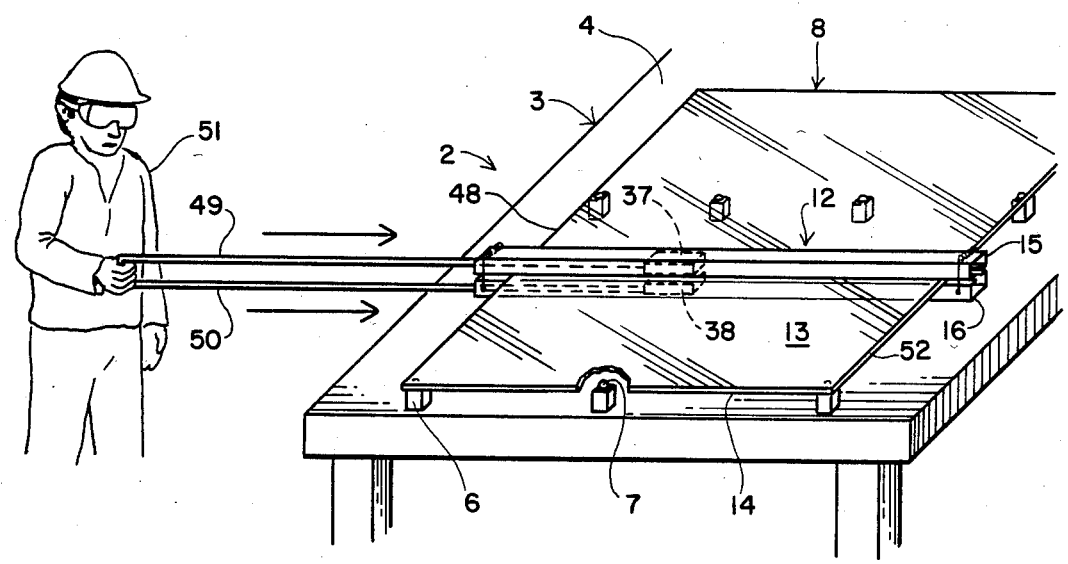
FIG. 1 is a perspective view illustrating the apparatus in association with a large laminated pane of glass in the process of being scored.

The channel 16 is configured similarly to the channel 15, being provided with a web portion 23 integral with side walls 24 and 25 which are in turn integral with flanges 26 and 27, respectively, as shown. The flanges 26 and 27 are mutually reaching but spaced to provide the opening 28 therebetween, and the two openings 22 and 28 in channels 15 and 16, respectively, face each other on opposite sides of the laminated pane of glass when the apparatus 12 is detachably mounted on such pane of glass as illustrated in FIGS. 1 and 2. As previously discussed, the pane of glass 8 is of the laminated type possessing an intermediate layer 29 of an appropriate plastic material that is adhesively secured to the facing surfaces of the individual panes of glass forming the assembled laminated pane 8.

To retain the two elongated channels 15 and 16 detachably clamped to opposite surfaces 13 and 14 of the laminated pane, there is provided at each end of the channel assembly a bale designated generally by the numeral 31 and including side members 32 and 33, which include perpendicular bearing portions 34 and 35 extending through appropriate apertures in the side walls 24 and 25 of the channel 16. The mutually reaching bearing portions 34 and 35 constitute pivots for the bales, the opposite ends of which are connected by a resilient spring member 36 as shown. Thus, when the two channels are attached to opposite sides of the laminated pane as illustrated in FIG. 2, the bales are pivoted from disengaged positions shown in broken lines in FIG. 2, to the full line positions in which the resilient spring member of each bale resiliently overlies the channel 15, thus causing the two channels to be securely yet resiliently clamped to opposite sides of the pane of glass 8. The bale assemblies are placed on the channels sufficiently close to their extreme ends that the inwardly projecting bearing portions 34 and 35 do not interfere with associated apparatus to be hereinafter described and which is utilized to effect scoring of the laminated pane of glass.

Figure 4:
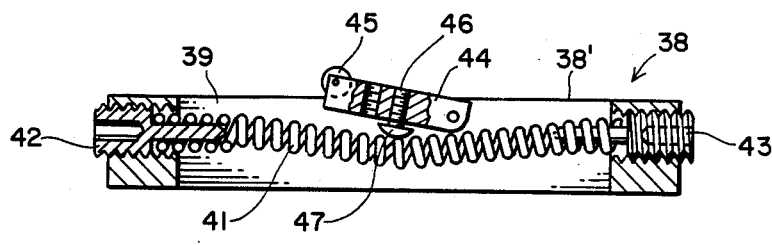
FIG. 4 is a vertical cross sectional view taken in the plane indicated by the line 4—4 in FIG. 5.
Figure 6:
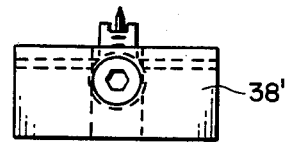
FIG. 6 end elevational view of the scoring means illustrated in FIG. 4.

Mounted within each of the channels 15 and 16, is a generally rectangular carrier. The carrier in channel 15 is designated by the numeral 37, while the carrier mounted in channel 16 is designated by the numeral 38. Since each of these carriers is identical to the other, in the interest of brevity in this description, only one of the carriers will be described. Reference is made to FIGS. 4 through 6, inclusive, in which the carrier assembly is designated generally by 38 and is shown to include a generally rectangular block 38′ conveniently formed from a suitable plastic material, but which may be formed from any appropriate metal or other suitable material. The carrier block 38′ is provided with a centrally disposed slot 39 within which is disposed an elongated coil compression spring 41, the ends of which are engaged by adjustable screw members 42 and 43 so that the compressive force on the spring may be adjusted. Also mounted in the slot 39, suitably pivoted to the carrier block 38′ is a pivotal cutter member designated generally by the numeral 44, equipped with a rotatable cutter or scoring wheel 45 adapted to score the assoiated glass when drawn therealong. An adjustable screw 46 is mounted on the cutter member the head 47 of the screw being adapted to impinge against spring 41 intermediate its ends as illustrated in FIG. 4. Thus, a resilient force is imposed on the pivoted member 44, causing the wheel 45 to impinge against the glass, preferably with a pressure of about eight pounds. By adjusting the compression of the spring 41 with the screws 42 and 43, the amount of pressure that is exerted may be varied so as to adjust the amount of pressure imposed by the cutting wheel 45 against the glass. Further adjustment of such pressures is provided by adjustment of the screw 46 in the block 44 to effect a greater or lesser extension, or by shifting the screw longitudinally of the pivoted member by threading it into an adjacent bore.

As illustrated in FIG. 1, with the elongated channels 15 and 16 clamped across the laminated pane of glass 8, the carrier members 37 and 38 are placed adjacent one elongated edge 48 of the pane, and there is inserted into the open ends of the channels 15 and 16 a pair of pusher rods 49 and 50 as shown, manipulated by an operator 51. To effect simultaneous scoring of both surfaces of the laminated pane of glass, all that is required is that the elongated rods 49 and 50 be pushed into the open ends of the channels against the carrier members 37 and 38. Continued inward movement of the rods causes the carrier members 37 and 38 to move to the right as viewed in FIG. 1, and as they move from one elongated edge 48 of the laminated pane to the opposite elongated edge 52, the cutting or scoring wheels 45 score lines 53 and 54 along the opposite surfaces 13 and 14 of the panes of glass 55 and 56. Such score lines are directly opposite each other and thus lie in the same plane but on opposite sides of the plastic intermediate layer.

Figure 9:
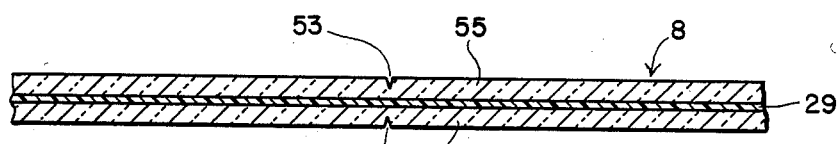
FIG. 9 is a fragmentary near actual size cross-sectional view of a laminated pane of glass.
Figure 10:
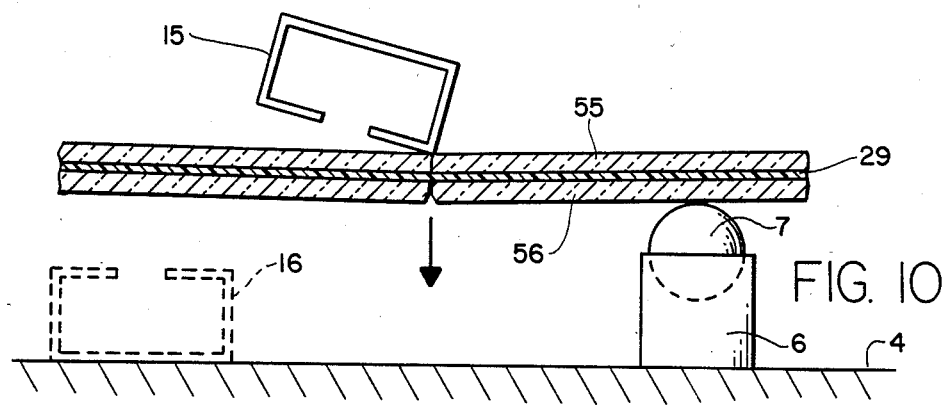
FIG. 10 is a fragmentary cross-sectional view illustrating the step by which the lower light of the laminated pane is cracked after scoring.
Figure 11:
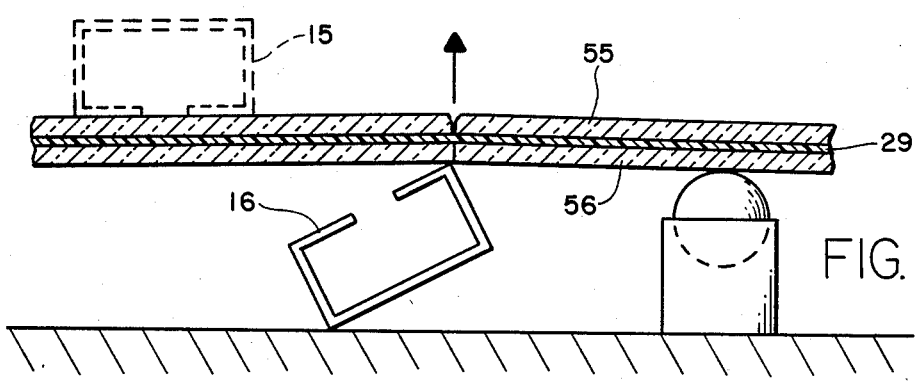
FIG. 11 is a fragmentary cross-sectional view similar to FIG. 10, but illustrating the step by which the upper light of the laminated pane is cracked along the score line.
Figure 12:
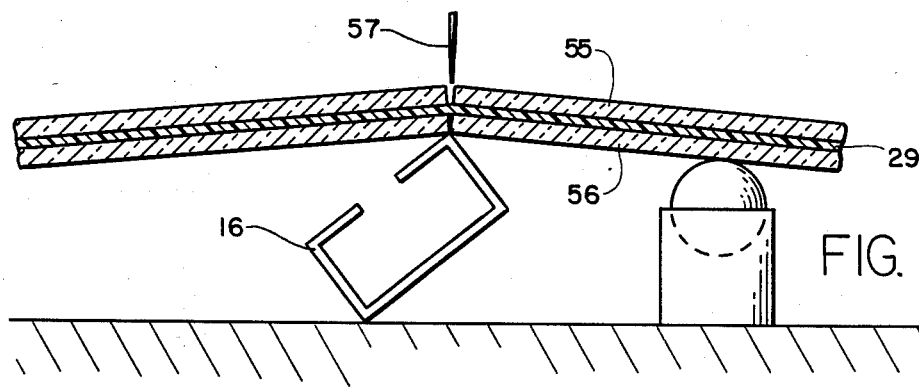
FIG. 12 is a fragmentary cross-sectional view illustrating the further step of opening the cracked pane sufficiently to effect cutting of the intermediate layer of plastic material.

Having scored both surfaces 13 and 14 of the pane, as illustrated in exaggerated form in FIG. 9, the apparatus 12 is now unclamped by releasing the bales 31 and 31' from opposite ends of the elongated channels 15 and 16. The carrier blocks 37 and 38 may also be removed from the channels, or they may be slid to either end thereof and retained in the channels. As illustrated in FIG. 10, the upper channel 15 is positioned with one elongated edge along the upper score 53 either tilted as shown or lying flat, and downward pressure is imposed on the pane at the score line, causing the lower score 54 to open and thus cause cracking of the glass pane 56 below the intermediate plastic membrane. Next, the channel 15 is laid aside as illustrated in FIG. 11, and the lower channel 16 is brought into alignment with the lower score 54 and crack line in the lower light 56 of the pane. The channel 16 is then tilted so that a corner imposes an upward thrust on the pane in the region of the crack (FIG. 11) thus causing the upper light 55 to crack along the score line 53 as shown. This still leaves the intermediate layer 29 intact, however, and I have found that by increasing the tilt of the channel 16 as illustrated in FIG. 12, the crack in upper light 55 is caused to open sufficiently to insert the sharp edge 57 of a razor blade or other suitable cutting tool. Having cut the transparent intermediate layer 29, the elongated channel member 16 may now be rotated back to its flat position and removed and the portion of glass pane on opposite sides of the cut may be separated in the usual manner.

It will thus be seen that with this simple yet effective apparatus, large panes of laminated glass may be handled easily and expeditiously, without the danger of cracking or breaking the glass, and without the necessity of lifting the glass pane and turning it over to effect separate scoring of both surfaces of the glass. It should of course be understood that while the invention has been described in relation to the cutting of a laminated glass in which two panes of glass are laminated to an intermediate layer of transparent plastic material, the invention may just as expeditiously be used to cut large panes of thick glass, such as plate glass. In such a case, only one score line on one surface of the pane need be made.

In the embodiment of the invention illustrated in FIGS. 7 and 8, the apparatus is designated generally by the numeral 61, and includes a table 62 on which is supported an upwardly opening U-shaped channel 63 on one web 64 of which is suitably secured an angle brace 66 one flange 67 of which is bored and threaded to receive a threaded cap screw 68 as shown. This construction occurs at both ends of the angle brace as illustrated in FIG. 7. The angle braces and the threaded cap screws 68 are utilized to support an elongated plate beam 69 which overlies the channel 63, providing a space between the top surface of the flange 67 of the angle brace 66 and the underside of the elongated plate beam 69. This space is utilized to receive the thickness of a pane of glass 71, and the height of the space is controlled in its extent by adjustment of the threaded cap screws 68 and particularly the nuts 72 threaded on the shanks of the cap screws and positioned below the elongated plate beam 69. Thus, by adjusting the extent of threaded engagement of the cap screws 68 with the flange 67 of the angle brace 66, the position of the plate 69 may be regulated, and once the desired position is achieved, the nuts 72 may be turned to lock against the underside of the elongated plate beam 69, thus capturing the elongated beam and retaining it in its selected position.

With the channel 63 thus supported on the table top 62, and the elongated beam 69 supported rigidly in relation to the channel 63, it will be seen that if a pane of glass 71 is supported on the table top 62 in the manner previously discussed, i.e., on rollable support balls, the laminated pane of glass 71 may be moved horizontally over the table top so as to occupy the space overlying the channel 63 and underlying the beam 69.

To effect scoring of the laminated pane 71, there is provided in the channel 63 a carrier member designated generally by the numeral 73 and including a body portion 74 equipped with rotatable wheels 75 and a glass scoring member 76 including a scoring wheel 77. The scoring member 76 constitutes a journal for the wheel 77, and is preferably spring-pressed in a direction to cause engagement of the wheel with the underside of the pane 71. For this purpose, a spring 78 is provided disposed between the member 76 and the carrier block 74 as illustrated in FIG. 7. Thus, the carrier member 73 is guided for movement by and between the two upright webs of the channel 63, so that when pushed or pulled therealong the scoring wheel 77 effects scoring of the underside of the pane 71.

To score the upper surface of the pane 71, there is provided a carrier member 81 including a body 82 on the lower edge of which are mounted wheels 83 that are journaled for rotation on the block 82, and which are adapted to roll on the top surface 84 of the plate beam 69. To provide lateral guidance for the carrier member as it moves along the plate beam 69, there are provided wheels 86 and 87, also rotatably journaled on the body 82, and which rollably engage the lateral edges of the elongated beam 69 as illustrated, preventing the carrier member from transverse deviation as it moves across the pane of glass 71. Thus, the cutter wheel 88 mounted rotatably on the underside of the block 82 on a suitable support structure 89 similar to the support structure 76 engages the upper surface of the pane 71 in a rolling contact that effects scoring of the upper surface of the pane in the manner previously described.

As before, the carrier members 73 and 81 may be moved transversely across the pane of glass 71 by a pair of elongated members as previously discussed in connection with the preferred embodiment of the invention illustrated in FIGS. 1 through 6. After the scoring has been completed, if the apparatus 61 is fixed to the table top, the pane 71 may be shifted horizontally so that the scored pane may be cracked and cut by the method previously described. On the other hand, if the apparatus 61 is not fixed to the table top, but is merely resting on it, then the apparatus may be moved aside and the remaining steps carried out as previously described.

Having thus described the invention, what is believed to be new and novel and sought to be protected by letters patent of the United States is as follows:

1. Apparatus for simultaneously scoring both glass layers of a laminated glass pane having an intermediate layer of a plastic material adhesively sandwiched between the two glass layers, comprising:
   (a) a first elongated member adapted to underlie said glass pane;
   (b) a second elongated member adapted to overlie said first elongated member on the opposite side of said glass pane;
   (c) means for binding said elongated members to each other on opposite sides of said glass pane; and
   (d) means operatively associated with said elongated members movable therealong to simultaneously score opposite sides of said glass pane;
   (e) said means for binding said elongated members to each other and to said glass pane including resilient bale means pivotally mounted adjacent opposite ends of one of said elongated members and selectively engageable with the corresponding end portion of the associated other elongated member to resiliently bias said elongated members toward each other when engaged whereby said glass pane is clamped between said elongated members.

2. The combination according to claim 1, in which said first and second elongated members are spaced apart, and said means movable therealong to simultaneously score opposite sides of said glass pane include a carrier member movably disposed on each elongated member including a glass scoring member mounted on each carrier member.

3. The combination according to claim 2, in which said means for binding said elongated members include elongated rods extending parallel to said elongated members and engaging said carrier members.

4. The combination according to claim 2, in which means are provided on each carrier member impinging resiliently on the associated scoring member.

5. The combination according to claim 1, in which said means movable along said elongated members to score said glass pane include a pair of mutually reaching scoring members adapted to engage opposite surfaces of said glass pane in a common plane.

6. The combination according to claim 1, in which said elongated members constitute guide tracks spaced apart and adapted to receive a glass pane therebetween, and said means for scoring opposite sides of said glass pane are guided and supported by said elongated guide tracks.

7. The combination according to claim 1, in which said means for binding said elongated members to each other also binds them to opposite sides of said glass pane.

8. The combination according to claim 2, in which said elongated members are hollow, and said carrier members are slidably movable within the hollow elongated members.

9. The combination according to claim 2, in which said glass scorrng members are resiliently biased toward said glass pane.

10. The combination according to claim 2, in which said carrier member includes selectively engageable elongated rods manipulable to effect movement of said carrier members.

11. The combination according to claim 2, in which one of elongated members is a plate beam spaced above the other elongated member, and means disposed between the plate beam and the other elongated member selectively adjustable to vary the space therebetween.

12. Apparatus for simultaneously scoring both glass layers of a laminated glass pane having an intermediate layer of plastic material adhesively sandwiched between the two glass layers, comprising:
   (a) a first elongated member adapted to underlie said glass pane;
   (b) a second elongated member adapted to overlie said first elongated member on the opposite side of said glass pane;
   (c) means for binding said elongated members to each other on opposite sides of said glass pane;
   (d) means operatively associated with said elongated members movable therealong to simultaneously score opposite sides of said glass pane; and
   (e) one of said elongated members comprising an upwardly opening channel having two upwardly extending webs; the other elongated member comprising an elongated flat plate beam spaced above said upwardly opening channel; brace means adjustably disposed between said channel and said plate beam; one of said carrier members being rollably supported within said channel, the other carrier member being supported and guided by said plate beam.

* * * * *